P. M. BARKER.
RHYTHM CHART.
APPLICATION FILED FEB. 24, 1919.
1,319,919. Patented Oct. 28, 1919.
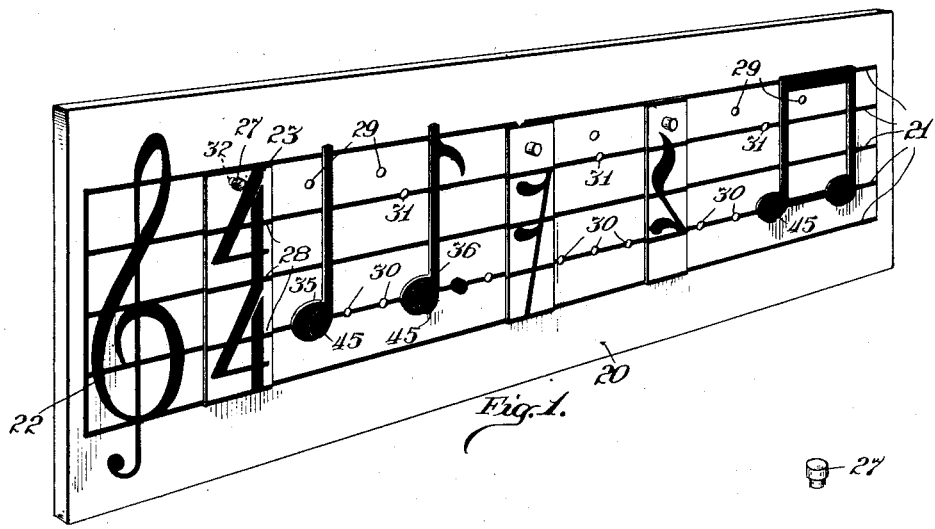
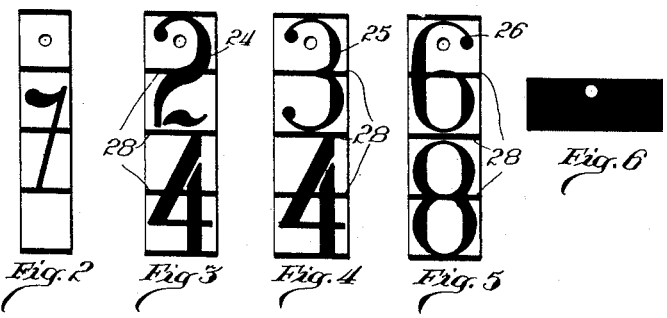 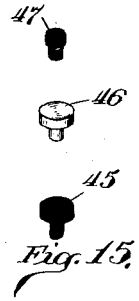
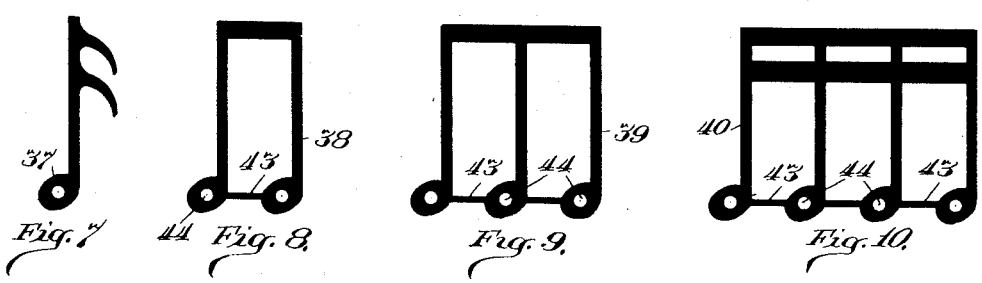
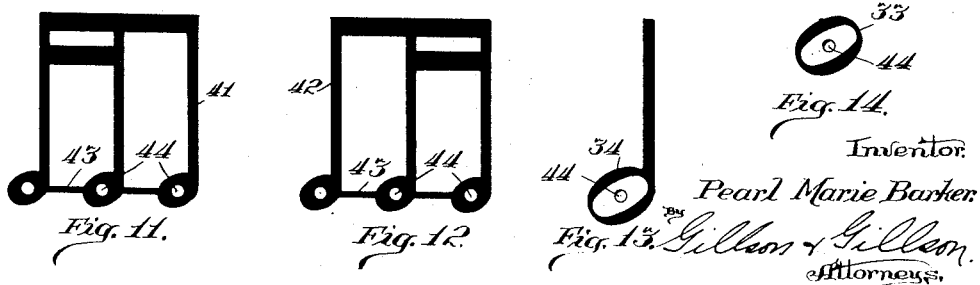
Inventor.
Pearl Marie Barker.
By Gillson & Gillson,
Attorneys.

UNITED STATES PATENT OFFICE.

PEARL MARIE BARKER, OF CHICAGO, ILLINOIS.

RHYTHM-CHART.

1,319,919. Specification of Letters Patent. Patented Oct. 28, 1919.

Application filed February 24, 1919. Serial No. 278,679.

*To all whom it may concern:*

Be it known that I, PEARL MARIE BARKER, a citizen of the United States, and resident of Chicago, county of Cook, and State of Illinois, have invented certain new and useful Improvements in Rhythm-Charts, of which the following is a specification, and which are illustrated in accompanying drawings, forming a part thereof.

The invention relates to a rhythm chart and has for an object the provision of a chart for teaching pupils the music symbols which indicate rhythm and to use them rightly in music notation. A further object is the provision of a chart and readily exchangeable characters for use therewith to indicate the various kinds of tempo and the various values of notes, rests, etc., whereby the proper composition of a measure may be illustrated. A further object is the provision of a chart or pattern and characters of the nature described which may be placed thereupon with neatness and despatch. A further object is the provision of a method for teaching music rhythm whereby the same is rendered especially graphic to the pupil.

In the accompanying drawings:

Figure 1 shows a perspective view of a chart with certain of the characters placed thereupon so chosen as to properly fill a measure, Fig. 2 shows an eighth rest, Figs. 3 to 5 inclusive, illustrate tempo marks to be used on the chart, Fig. 6 shows a character to be used either as a whole or half rest, depending upon the position in which it is used, Figs. 7 to 14 inclusive, show different values of notes, as cut out of suitable card or other material for use on my chart, Figs. 2 to 14 are front views of the various characters represented, Fig. 15 shows in perspective a variety of pegs to be used in connection with my chart and characters.

In Fig. 1, generally designated by 20, is shown a perspective view of a chart which may be made of heavy paste board or wood or other suitable material and provided with lines, five in number, indicated at 21, which lines are arranged with corresponding spaces as used in the writing of music. Upon this chart at 22 is the character indicating the treble clef in music. Placed upon the chart is a card or character 23 for use in indicating 4—4 tempo. Other characters interchangeable with 23 are shown at 24, 25 and 26, Figs. 3 to 5 inclusive, which when placed upon the chart will indicate the corresponding changes of tempo. These characters are intended to be fastened to the chart by means of a white peg such as shown at 27, Fig. 15, and by the corresponding reference character on Fig. 1. It is to be noted that the characters 23 to 26 inclusive, carry lines 28 which, when placed upon the chart, will coincide with the music lines on the chart and give the appearance of the tempo mark being printed directly upon the chart.

Holes 29, 30, 31 and 32 are indicated upon the chart, which holes are supplied for convenience in attaching the various characters thereto, 32 being for the attachment of the tempo characters, 29 for the attachment of quarter, eighth and sixteenth rests, 31 for attachment of whole and half rests and 30 for use in attaching the characters representing the various values of notes.

Characters are illustrated for representing each of the different values of notes used in indicating rhythm. At 33, Fig. 14, is the whole note, at 34, Fig. 13, is the half note, at 35 and 36, shown in place upon the chart, is the quarter note and eighth note and at 37, Fig. 7, is the sixteenth note. In addition to the various notes already referred to I have illustrated at 38 double tied eighth notes and 39 triple tied eighth notes. At 40 quadruple tied sixteenth notes, at 41 two sixteenth and one eighth notes in the order named and at 42 one eighth, two sixteenth notes, as indicated. To render the tied notes durable in use I have shown the bottom portion of the character representing the notes tied together by a member as 43. This member 43 is stamped out of the material of which the character is formed and is preferably of a width substantially the same as the width of the music lines upon the chart and also of the same appearance. When placed upon the chart this member 43 is designed to register with the music lines already upon the chart so as to be substantially unapparent, the characters when in place upon the chart giving the appearance of having been printed thereon.

To readily attach the characters to the chart I have illustrated the characters as being provided with holes 44 and have provided plugs or pins 45, 46, 27 and 47, for passing through these holes and into the proper hole in the chart. Pin 45 is made black in order not to be apparent when in use in connection with the black note, as a quarter, eighth or sixteenth, and 46 is made white and is designed to be used with the whole or half note so as not to be apparent when in use therewith. A black plug 47 is illustrated in Fig. 15 and, as in use upon the chart in Fig. 1. This plug is for use in illustrating a dotted note of any value. The use of my device will be as follows.

The chart will be placed in the view of the pupil or pupils to be instructed and a tempo character 23, 24, 25, or 26, placed upon the chart. The teacher will then illustrate to the pupil by proper choice of different values of notes, dotted notes, and rests, how a measure may be rendered complete or will require the pupil to so illustrate. If desired the teacher may supply a portion of the measure and require the pupil to complete the measure or to tell why the same is not complete. The value of the invention lies in the readiness with which the characters may be changed and in the physical contact which the pupil has with the various characters thereby causing their use to be impressed upon his memory more securely.

It will be noted that the peg holes on the chart are so located as to properly aline or position the various characters thereon.

While I have illustrated and described my invention with especial reference to rhythm it is to be understood that it may be applied to teaching other elements of music and is to be limited only by the scope of the claims.

I claim as my invention:

1. As an article of manufacture, a piece of material shaped to correspond with a plurality of printed characters as used in musical notation, a portion of said article being adapted to correspond and register with a line upon a music chart and being similar in appearance thereto whereby, when said article is used upon a chart, with said portion in register with a line, said portion will be unapparent.

2. In a rhythm chart, and in combination, a board bearing lines to represent a measure in music and provided with holes, a piece of material shaped to correspond with a plurality of printed characters as used in musical notation, a portion of said piece being adapted to correspond and register with a line and being similar in appearance thereto said piece of material having a hole adapted to register with the holes in said board when said portion is in register with one of said lines, a plug to secure said piece of material to said chart whereby when said piece is used on said chart said portion will be indistinguishable from the said line.

PEARL MARIE BARKER.